M. P. Hall,
Pump.
No. 99,884. Patented Feb. 15. 1870.
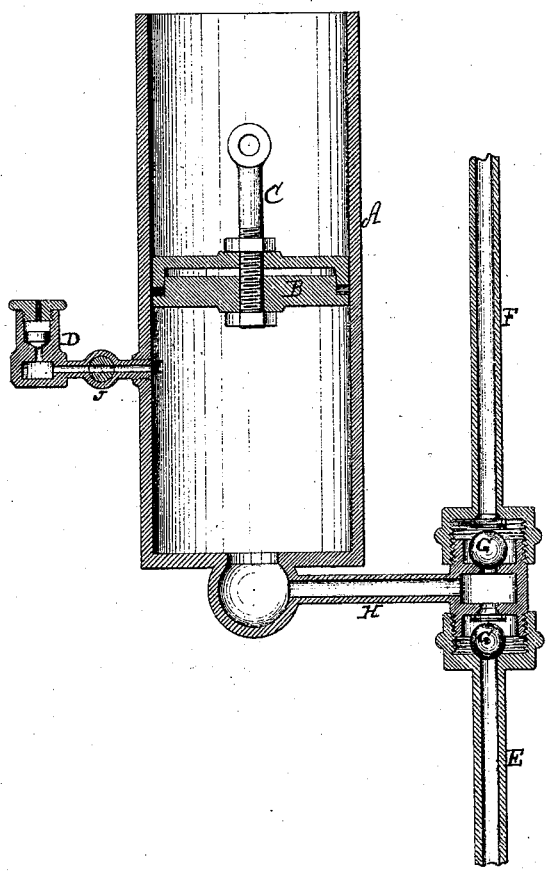
Witnesses:
A Bennewendorf
Geo. W. Mabee
Inventor:
M. P. Hall
per Munn
Attorneys.

United States Patent Office.

MORGAN P. HALL, OF GAYVILLE, ILLINOIS.

Letters Patent No. 99,884, dated February 15, 1870.

IMPROVEMENT IN PUMPS.

The Schedule referred to in these Letters Patent and making part of the same.

To all whom it may concern:

Be it known that I, MORGAN P. HALL, of Gayville, in the county of White, and State of Illinois, have invented a new and useful Improvement in Pumps; and I do hereby declare that the following is a full, clear, and exact description thereof, which will enable others skilled in the art to make and use the same, reference being had to the accompanying drawing forming part of this specification.

This invention relates to a new and useful improvement in pumps for raising water and other liquids; and It consists in the construction, arrangement, and operation, as hereinafter described, whereby many of the objections to the ordinary lifting and forcing pump are obviated.

The accompanying drawing represents a vertical section of a pump constructed according to my invention.

Similar letters of reference indicate corresponding parts.

A is the cylinder or barrel of the pump.
B is the plunger or piston.
C represents the plunger-rod.
D is an air-valve with a stop-cock.
E is the supply-pipe; and
F is the discharge-pipe.

Each pipe is provided with a valve, G, and connected with the barrel A, by means of the pipe H.

The plunger B is suitably packed, so that it works air-tight in the barrel, and is so arranged that it moves up and down only half the length of the barrel.

As it moves up, a vacuum is formed in the barrel below it, and water rushes up through the supply-pipe.

On its down motion, the water is forced out through the pipe F.

The valves G may be ball-valves, as seen in the drawing; or any other suitable kind of valve, so that they open and close alternately as the plunger works up and down.

For the purpose of preventing the wearing of the plunger against the sides of the barrel, caused by the fine sand and other foreign matter held in suspension in the water, I provide for confining a body of air between the plunger and the surface of the water in the barrel, thus preventing the plunger from coming in contact with the water.

It will be noticed that the plunger rises a certain distance above the valve aperture at I.

The space from I to the bottom of the plunger is filled by air confined by closing the stop-cock J, after the plunger has been raised to its highest point, as seen in the drawing. This saves the plunger from contact with the water, and prevents the particles of sand from being forced between the plunger and the barrel, and causing the packing of the plunger to wear and become leaky.

I am aware that air has been long used as an auxiliary to force water upwards, and I disclaim this as any part of my invention; but What I do esteem as my invention, and desire to secure by Letters Patent, is—

The arrangement of the valved air-inlet, constructed as described, at the side of the piston-chamber, and at some distance above the lowest point of depression reached by the piston on its downward stroke, all as shown and set forth.

MORGAN P. HALL.

Witnesses:
   J. E. OSCAR CLARKE,
   JESSE W. ROSE.